(No Model.)
W. W. HAUPT.
WAGON ATTACHMENT.
No. 424,981. Patented Apr. 8, 1890.
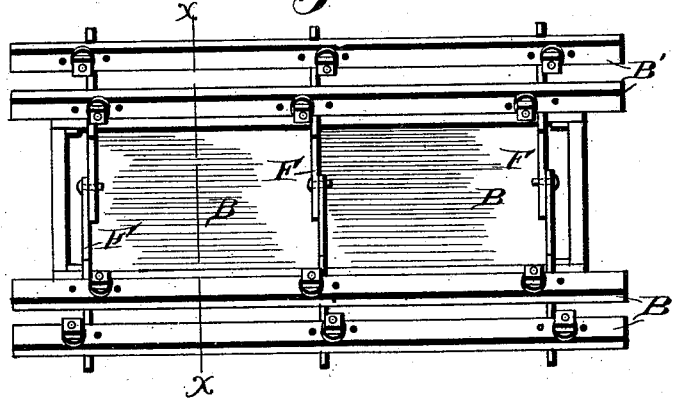
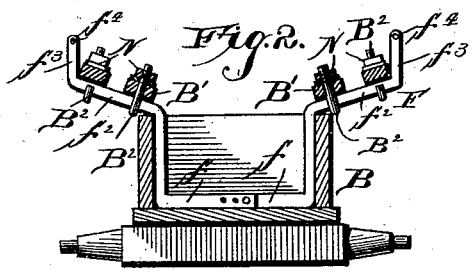
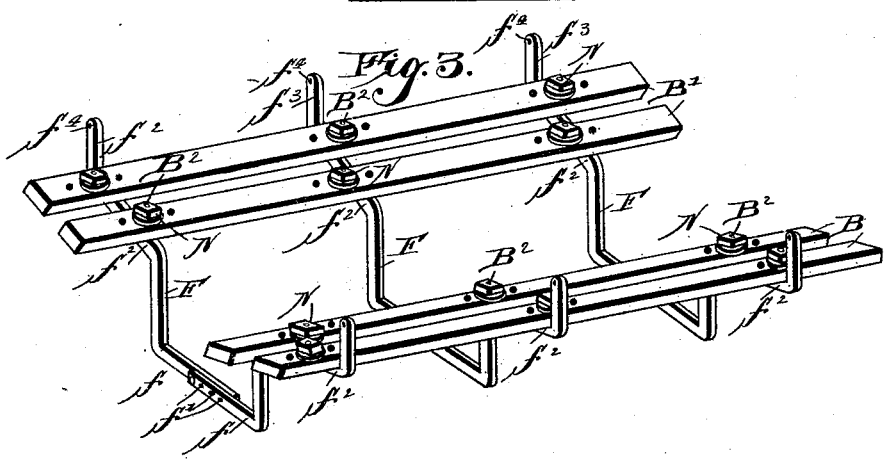
Witnesses:
Henry G. Dieterich
J. Thomson Cross
Inventor:
William W. Haupt
per
Atty.

UNITED STATES PATENT OFFICE.

WILLIAM W. HAUPT, OF KYLE, TEXAS.

WAGON ATTACHMENT.

SPECIFICATION forming part of Letters Patent No. 424,981, dated April 8, 1890.

Application filed November 30, 1889. Serial No. 332,146. (No model.)

*To all whom it may concern:*

Be it known that I, WILLIAM W. HAUPT, a citizen of the United States, residing at Kyle, in the county of Hays and State of Texas, have invented certain new and useful Improvements in Wagon Attachments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Referring to the drawings, Figure 1 is a top plan view of a wagon-body provided with my improved hay frame or rack. Fig. 2 is a section on line $x\ x$ of Fig. 1, and Fig. 3 is an isometric view of the hay frame or rack detached.

The invention relates to hay frames or racks for use with the ordinary box wagon-bodies; and it has for its object to provide a light frame or rack of simple construction adapted for adjustment to wagon boxes or bodies of different width and so constructed as to be folded in a compact form.

To these ends the invention consists in a foldable hay frame or rack adapted to fit into a wagon-body and adapted for adjustment to such body; also, in structural features and combinations of parts, substantially as hereinafter fully described.

Referring to the drawings, B indicates the wagon bed or box, which may be of any usual or preferred construction and provided with a suitable end-gate.

The hay rack or frame F is composed of a plurality of angle-irons (usually about three for an ordinary two-horse wagon) for the support of the longitudinal boards or outriggers B'. These angle-irons are formed in two sections or parts, the horizontal arms $f$ of which are pivotally connected, and both of said arms are provided with a plurality of pin-holes $f'$, so as to adapt the frame for adjustment to wagon-bodies varying in width. The arms or extensions $f^2$ are slightly inclined and terminate in vertical standards $f^3$, that in practice are preferably provided with an eye $f^4$ in their outer end for the reception of a longitudinal rod (not shown) or for the attachment of ropes for securing the load. The longitudinal boards or outriggers B' B' are secured to the inclined arms $f^2$ of the angle-irons by means of hook-bolts B$^2$ and a nut N, so that said boards can be readily removed when desired or adjusted on the inclined arms, as required.

Although it might appear that the frame F would double up on its hinge-joint in case a weight were placed upon the outriggers B', and thus throw said frame out of the wagon-bed, yet this is not the case, owing to the fact that the frame is thoroughly braced by the wagon-bed and its standards.

In adjusting the frame to the width of a wagon-bed the pivot-bolts $f^5$, that connect the arms $f$, are removed and one or both angle-irons moved toward or from each other the required distance. The adjustment relatively to the length of a wagon-bed may be done by providing the outrigger-boards B' with a plurality of bolt-holes for the hook-bolts B$^2$, so as to adapt the angle-irons to be moved toward or from one another. I prefer, however, to remove the boards and substitute therefor boards of proper length.

Having described my invention, I claim—

1. A hay frame or rack for wagons, comprising supports for outriggers, each composed of two sections adapted for adjustment relatively to each other, so that said supports may be fitted to wagons varying in width, substantially as and for the purposes specified.

2. A hay frame or rack for wagons, comprising supports for outriggers, each composed of two sections pivotally connected together, said sections being adjustable relatively to each other as that said supports may be fitted to wagons varying in width, substantially as and for the purposes specified.

3. A hay frame or rack for wagons, composed of supports for outriggers, each consisting of two sections adapted to be adjusted relatively to each other as that said supports may be fitted to wagons varying in width, in combination with outriggers detachably secured to and connecting the said supports, substantially as and for the purposes specified.

4. A hay frame or rack for wagons, constructed of sections pivotally and adjustably connected together, in combination with outrigger-boards secured to and connecting said sections, whereby said frame may be adjusted to fit wagons varying in width and folded when removed, substantially as and for the purposes specified.

5. A knockdown or folding hay frame or rack for wagons, constructed of angle-irons, each composed of two sections pivotally and adjustably connected together, in combination with outrigger-boards adjustably connected with said frame-arms, whereby the frame may be adjusted both as to length and width to fit wagons varying both in length and width, substantially as and for the purposes specified.

6. A knockdown or folding hay frame or rack for wagons, consisting of supports for outriggers, each composed of two angle-irons detachably connected together and adjustable relatively to each other as that said supports may be fitted to wagons varying in width, said angle-irons having inclined arms $f^2$, in combination with the outrigger-boards B', the hook-bolts B, and nuts N, substantially as and for the purposes specified.

7. A hay frame or rack for wagons, comprising supports for outriggers constructed of angle-irons having inclined arms $f^2$ and vertical arms $f^3$, said arms $f^3$ being provided with an eye $f^4$ at their outer end, in combination with outrigger-boards secured to the arms $f^2$ of the supports, substantially as and for the purposes specified.

In testimony whereof I affix my signature in presence of two witnesses.

WM. W. HAUPT.

Witnesses:
J. N. WHISENANT,
A. W. WRIGHT.